United States Patent Office 3,066,662
Patented Dec. 4, 1962

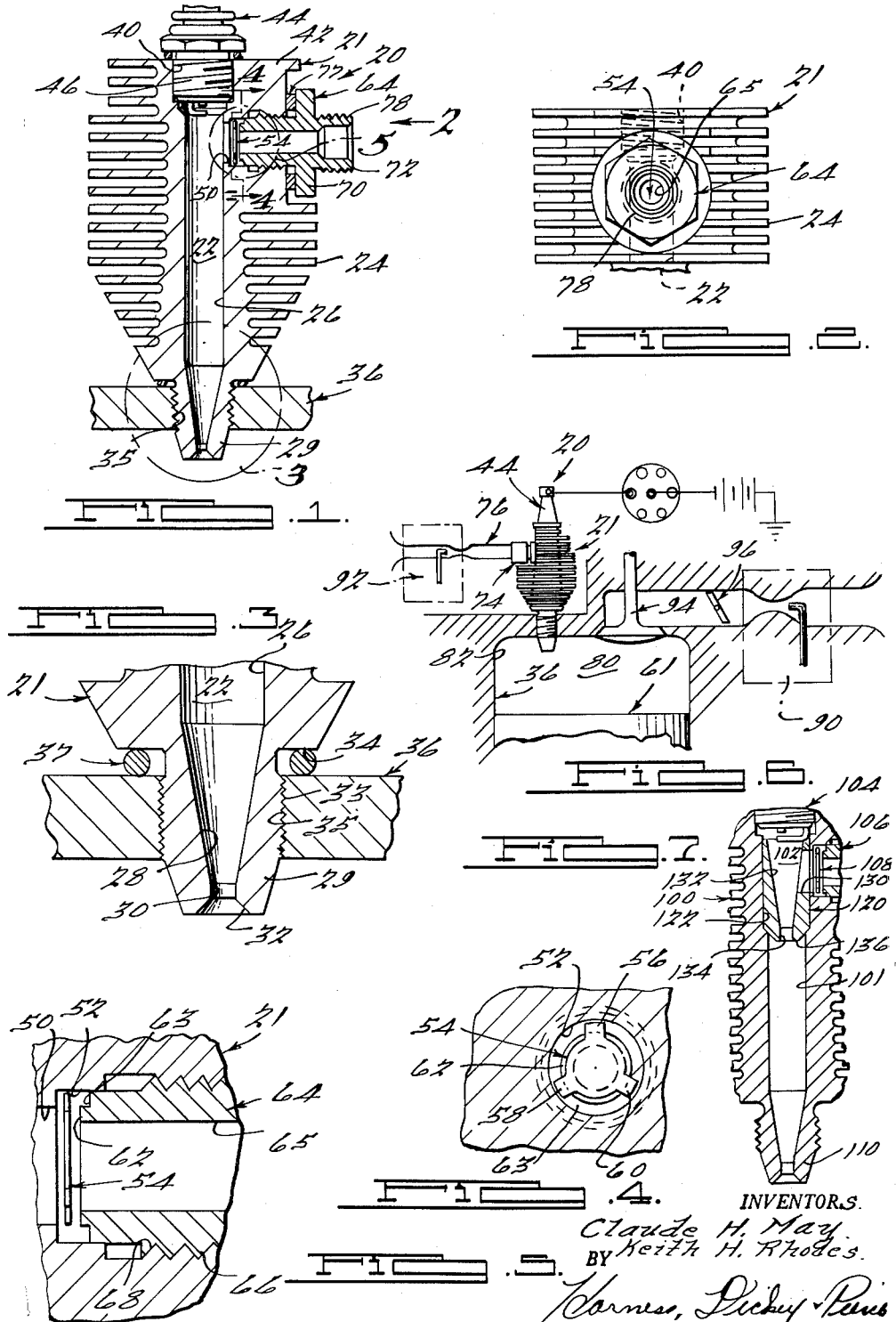

3,066,662
IGNITION DEVICE FOR INTERNAL
COMBUSTION ENGINES
Claude H. May and Keith H. Rhodes, Racine, Wis., assignors to Walker Manufacturing Company, Racine, Wis., a corporation of Delaware
Filed Aug. 26, 1960, Ser. No. 52,125
3 Claims. (Cl. 123—143)

This invention relates generally to combustion systems and more particularly to a combustion system for a conventional automotive type spark ignition engine.

It is generally accepted that relatively efficient and complete combustion is possible with relatively lean air-fuel mixtures. However, it has long been a problem to modify conventional spark ignition internal combustion engines in such a manner that the advantages inherent in the combustion of relatively lean air-fuel mixtures can be obtained without deleteriously affecting operation of the engine in other respects.

Theoretically, the more air that can be burned with a given amount of fuel, the closer will be the approach of engine cylcle efficiency to the air standard efficiency for the particular cycle. In conventional spark ignition engines an air-fuel ratio of 20 to 25 pounds of air to 1 pound of gasoline is often considered to be a maximum under laboratory conditions and a ratio of 16 to 18 pounds of air to 1 pound of fuel to be the practicable maximum under field conditions. Notwithstanding the above limits, it is known that extremely lean mixtures, for example, mixtures having an excess of 25 pounds of air to 1 pound of fuel can be ignited and burned to completion when a pilot charge of about 5% of the total fuel is injected into the combustion chamber immediately before a working piston therein reaches top dead center. However, to effect such operation in engines heretofore known and used, diesel engine compression ratios have been necessary to ignite the pilot spray. Therefore, the mixture strength of the main or carbureted mixture has been limited to approximately 25 pounds of air to 1 pound of fuel, to preclude self-ignition of the carbureted mixture with its inherent diesel knock. Engines of this type give very efficient combustion, but the specific power output is limited by the relatively small amount of fuel burned per working stroke.

A combustion system in accordance with the present invention does not require the aforementioned relatively high compression ratio and therefore is usable with conventional spark ignition engines, improving the economy thereof and reducing nauseous exhaust fumes. The combustion system is relatively easily added to existing automotive type internal combustion engines requiring only minor modification thereof, namely, adjustment of the main carburetor of the engine to "lean out" the resultant air-fuel mixture.

In accordance with the present invention, a relatively small auxiliary combustion chamber is provided for each main combustion chamber of the engine. Each auxiliary chamber has a nozzle that is engageable in the conventional spark plug aperture so as to communicate with and extend into the main combustion chamber of the engine. A conventional spark plug is accepted in a complementary aperture in the auxiliary combustion chamber and functions to ignite a combustible air-fuel mixture that is inducted into the auxiliary combustion chamber on the intake stroke of its associated piston and stratified in the area of the spark plug on the compression stroke of the piston. The auxiliary combustion chamber communicates with the main combustion chamber of the engine, through an orifice that exhibits a relatively good flow coefficient to the burning air-fuel charge upon passage thereof into the main combustion chamber and a relatively poor flow coefficient to fluids passing from the main combustion chamber into the auxiliary combustion chamber.

The air-fuel stratus within the auxiliary combustion chamber, preferably a substantially stoichiometric mixture, is ignited independently of the mixture in the main combustion chamber, so that, by sizing the volume of the auxiliary combustion chamber and the pilot air-fuel charge to maintain idle of the engine, enough mixture is present to torch off the relatively lean air-fuel mixture in the main combustion chamber of the engine under all load conditions.

Accordingly, one object of the present invention is an improved combustion system for an internal combustion engine.

Another object is a combustion system that is compatible with existing spark ignition internal combustion engines.

Another object is a combustion system wherein a stratified air-fuel mixture is ignited by a conventional spark plug to effect ignition of a relatively lean air-fuel mixture.

Other objects and advantages of the present invention will become apparent from the following description wherein reference is made to the drawings in which:

FIGURE 1 is a sectional side view of an auxiliary combustion chamber in accordance with an exemplary embodiment of the present invention;

FIG. 2 is a view taken generally in the direction of the arrow 2 of FIGURE 1;

FIG. 3 is an enlargement of the area within the circle 3 of FIGURE 1;

FIG. 4 is a fragmentary cross sectional view taken substantially along the line 4—4 of FIGURE 1;

FIG. 5 is an enlargement of the area within the circle 5 of FIGURE 1;

FIG. 6 is a diagrammatic view showing the auxiliary combustion system in operative association with an internal combustion engine; and FIG. 7 is a fragmentary view of a modified auxiliary combustion chamber.

More particularly, the combustion system of the present invention comprises a plurality of auxiliary combustion chambers for connection to the main combustion chambers, respectively, of an internal combustion engine. The auxiliary combustion chambers are similar in construction, therefore one such chamber will be described hereinafter.

The auxiliary combustion chamber communicates with its associated main combustion chamber through a nozzle which, in longitudinal cross section, is a convergent-divergent venturi. The slope of the downwardly convergent portion of the venturi is relatively gradual whereas the slope of the downwardly divergent portion is relatively steep so that the nozzle exhibits different flow coefficients to the flow of fluids into and out of the auxiliary combustion chamber to make it easier for fluid to leave the chamber than enter it. The nozzle extends beyond the chamber wall and well into the main combustion chamber so that the terminal end portion thereof is disposed in a relatively slow moving fluid stratum to further restrict fluid flow back into the auxiliary combustion chamber on the compression stroke of the piston.

The auxiliary combustion chamber has a small automatic valve for the admission of a combustible pilot charge which preferably is an air-fuel mixture of approximately stoichiometric proportions provided by a conventional relatively simple and small carburetor. The pilot charge is stratified within the upper end of the auxiliary combustion chamber on the compression stroke of the engine, ignition thereof being effected by a spark plug, the points of which are disposed in the relatively rich air-fuel stratus. The pilot charge is sized to support idling of the engine and the main carburetor-throttle system of the engine is adjusted so that at idle no air-fuel mixture is supplied to the engine from the main carburetor.

When more power is demanded from the engine, either the throttle of the main carburetor is opened, admitting a greater weight of relatively lean mixture, or a relatively richer mixture is admitted through the conventional intake valve as by adjusting the fuel jets in the main carburetor, both of these expedients being well known. Thus under a part-load condition, which is the most common operating condition, a relatively lean air-fuel mixture is fed to the main combustion chamber and a pilot charge of stoichiometric proportions is fed to the auxiliary combustion chamber. Even with an abnormally lean mixture, for example, a mixture of 30 to 50 pounds of air to 1 pound of fuel, the heat release from the combustion of the stratified pilot charge is sufficient to ignite the lean charge in the main combustion chamber. As the working piston in the main combustion chamber passes top dead center, the burning pilot charge is injected at relatively high velocity through the nozzle of the auxiliary combustion chamber into the main combustion chamber and, unlike a spark plug, constitutes a multiple ignition source of sufficient heat value to effect ignition of a very lean main charge.

The auxiliary valve in the auxiliary combustion chamber is opened by a pressure differential thereacross created by lowered pressure in the main and auxiliary combustion chambers during the induction stroke of the working piston. During the compression stroke, the charge in the auxiliary combustion chamber is compressed and stratified so that, at the time spark ignition thereof occurs, under the control of the conventional electrical ignition system, the charge is preferably of approximately stoichiometric proportions at the top of the auxiliary combustion chamber adjacent the spark plug but of approximately the same mixture strength as the main combustion chamber near the nozzle end thereof. The shape of the auxiliary combustion chamber and of the nozzle influences the degree of mixing of the relatively lean and rich charges.

Referring now to the drawing, an exemplary constructed embodiment of a combustion system 20 in accordance with the present invention comprises a tubular housing 21 having an elongated cylindrical auxiliary combustion chamber 22 therein for the ignition of a pilot air-fuel mixture. The tubular housing 21 has a plurality of axially spaced radially outwardly extending fins 24 thereon for the radiation and conduction of excess heat away from the combustion chamber 22.

The auxiliary combustion chamber 22 is defined by a cylindrical bore 26 that extends longitudinally of the housing 21 leading into a downwardly convergent conical section 28 of a nozzle 29 (FIG. 3). The conical section 28 leads into a cylindrical orifice 30, the nozzle 29 terminating in a downwardly divergent conical section 32. The convergent section 28, orifice 30 and divergent section 32 of the nozzle 29 define a venturi at the lower end of the auxiliary combustion chamber 22.

The nozzle 29 of the housing 21 has an externally threaded portion 33 terminating in a radial shoulder 34 to facilitate acceptance and seating of the housing 21 in, for example, a spark plug aperture 35 in a cylinder head 36 of a conventional spark ignition engine. A suitable sealing gasket 37 may be interposed between the shoulder 34 and the cylinder head 36 to effect a positive seal therebetween.

The housing 21 has a threaded bore 40 in an upper end portion 42 thereof generally coaxially aligned with the combustion chamber 22 for the acceptance of a conventional spark plug 44, a lower end portion 46 of which defines the upper end of the auxiliary combustion chamber 22.

As best seen in FIG. 5, the housing 21 has a transverse bore 50 and counterbore 52 near the top communicating with the combustion chamber 22 for the acceptance and positioning of a disc type valve 54. The valve 54 is of generally circular transverse cross section (FIG. 4) and has three radially outwardly extending fingers 56, 58 and 60 that position the valve 54 radially within the counterbore 52 of the housing 21.

The valve 54 is freely movable axially of the counterbore 52, in response to a pressure differential thereacross, to permit induction of a pilot charge into the auxiliary combustion chamber and thereafter compression of the pilot charge within the auxiliary combustion chamber. The pressure differential created upon the induction stroke of the piston 61 (FIG. 6) effects movement of the valve 54 to the left (FIG. 5), permitting a pilot charge to be drawn into the chamber 22. The pressure differential is reversed on the compression stroke of the piston 61 whereupon the valve 54 is biased against a complementary seat 62 on an end face 63 of a fuel inlet fitting 64.

The fitting 64 has a central bore 65 for the passage of the pilot charge and a threaded outer portion 66 for the acceptance in a complementary threaded portion 68 of the counterbore 52. A radial flange 70 of hexagonal transverse cross section facilities rotation and advancement of the fitting 64 into the counterbore 52 in the housing 21 to properly position the end face 62 axially with respect to the bore 50 and counterbore 52. The fitting 64 has an externally threaded outer end portion 72 for the acceptance of a conventional conduit fitting 74 and fuel line 76 (FIG. 6). A suitable gasket 77 may be interposed between the flange 70 of the fitting 64 and the housing 21 to prevent leakage.

As best seen in FIGS. 1, 3 and 6, the nozzle 29 of the housing 21 extends through the aperture 35 in the cylinder head 36 into a main combustion chamber 80 (FIG. 6) of the internal combustion engine. The nozzle 29 is extended into the combustion chamber 80 because, upon the compression stroke of the piston 61, the fluids within the combustion chamber 80 move at relatively high velocity in a stratum next to the wall 82 of the combustion chamber 80, for example, at a distance of $\frac{1}{16}$ of an inch from the wall 82 thereof. On the other hand, fluid flow within the combustion chamber 80 relatively farther away from the wall 82 thereof, for example, at a distance of $\frac{1}{4}$ of an inch from the wall 82, is relatively slower than in the aforementioned closely spaced stratum. Therefore, in accordance with one feature of the present invention, the nozzle portion 29 of the housing 21 extends well into the combustion chamber 80 thereby to extend into an area of reduced fluid velocity and turbulence. Accordingly, any back fluid flow through the orifice 30 of the nozzle 29 from the chamber 80 on the compression stroke of the piston is at relatively low velocity thereby minimizing turbulence within the auxiliary combustion chamber 22 and providing optimum conditions for the stratification of the combustible pilot air-fuel mixture therein.

Back flow into the combustion chamber 22 and the turbulence therein is further restricted by the shape of the nozzle 29. The upwardly convergent section 32 of the nozzle 29 makes a relatively large angle with the central axis of the combustion chamber 22 whereas the downwardly convergent portion 28 of the nozzle 29 forms a relatively small angle with the central axis of the combustion chamber 22. Therefore, the nozzle 29 exhibits a relatively poor nozzle coefficient against fluid flow into the combustion chamber 22 whereas a relatively good nozzle coefficient is exhibited for the ignited gases leaving the auxiliary combustion chamber 22 after ignition thereof by the spark plug 44.

Referring to FIG. 6, installation of the auxiliary combustion system 20 on a conventional internal combustion engine requires only minor modification of a conventional carburetor 90 thereof primarily to "lean out" the resulting mixture to obtain the aforementioned operational advantages inherent in a lean mixture. Such a "leaning out" can be accomplished by, for example, adjusting or replacing the fuel jets in the well known manner. The standard ignition system is used to fire the spark plug 44.

An operating cycle is initiated when the piston 61 of the internal combustion enginge starts on its intake stroke to create a partial vacuum in both the main combustion chamber 80 and in the auxiliary combustion chamber 22, causing the valve 54 to open due to the resultant pressure differential thereacross. A combustible and preferably stoichiometric mixture of air and fuel from an auxiliary carburetor 92, for example, a Tillotson Manufacturing Co. model 19898–1735 carburetor, is drawn into the auxiliary combustion chamber 22 through the conduit 76. Simultaneously, assuming the engine is operating at a part-load condition, a relatively lean mixture is drawn through the main inlet valve 94 of the engine from the main carburetor 90, the weight or strength of the mixture being related to the load on the engine. As the engine cycle progresses to the compression stroke, the relatively lean mixture in the main combustion chamber 80 is compressed as is the stratified stoichiometric mixture in the auxiliary combustion chamber 22. Near the end of the compression stroke, the spark plug 44 is fired and ignition of the pilot charge raises the pressure in the auxiliary combustion chamber 22 above the pressure in the main combustion chamber 80 effecting a mass flow into the main combustion chamber 80 from the auxiliary combustion chamber 22. This flow consists of a burning, torch-like jet that effectively ignites the lean mixture in residence in the main combustion chamber 80, causing relatively complete combustion thereof.

The power output of the engine is controlled by the main carburetor 90 by varying either the air-fuel ratio of the lean mixture or the weight of lean mixture admitted into the combustion chamber as by a throttle plate 96.

Referring now to FIG. 7, a further reduction of turbulence within the auxiliary combustion chamber in the area of the spark plug improving stratification of the pilot air-fuel charge therein can be effected by providing a plurality of generally coaxially aligned nozzles each exhibiting the same relatively good and poor flow coefficients to fluid flow outwardly and inwardly of the auxiliary combustion chamber, respectively.

More particularly, a modified tubular housing 100 has a tubular bore 101 therein having an auxiliary combustion chamber 102 at an upper end thereof for the ignition of a stratified pilot air-fuel mixture. The tubular housing 100 is similar in construction to the housing 21 discussed hereinbefore with respect to the disposition and function of a spark plug 104, an inlet valve fitting 106 and an inlet valve 108. Also, the housing 100 has a first nozzle 110 at a lower end thereof similar to the nozzle 29 of the housing 21 discussed hereinbefore.

However, the embodiment shown in FIG. 7 has a second nozzle 120 supported in a chamfered counterbore 122 at the upper end of the tubular bore 101. The nozzle 120 has a transverse aperture 130 therein in alignment with the inlet valve 108 for the passage of a pilot air-fuel mixture into the auxiliary combustion chamber 102. The nozzle 120 has a downwardly convergent portion 132 terminating in an orifice 134. It is to be noted that a lower end face 136 of the nozzle 120 extends generally normally to the central axis thereof thereby to exhibit a relatively poor flow coefficient to the flow of fluid axially into the auxiliary combustion chamber 102. However, the downwardly convergent portion 132 of the nozzle 120 exhibits a relatively good coefficient to the flow of fluid outwardly of the auxiliary combustion chamber 102. In this manner, turbulence within the pilot air-fuel mixture after induction thereof into the auxiliary combustion chamber 102 is minimized, yet the air-fuel charge is stratified upon the compression stroke of the working piston of the engine. As in the earlier disclosed embodiment, stratification of the pilot air-fuel mixture is maximized in the area of the auxiliary combustion chamber 102 immediately underlaying the spark plug 104. Tests have shown that the use of the aligned nozzles 110 and 120 does not deleteriously affect flow of the ignited air-fuel mixture axially outwardly of the housing 100 into the main combustion chamber of the internal combustion engine. Rather, the improved stratification obtained by the use of the aligned pair of nozzles 110 and 120 may, in some cases, so condition the pilot air-fuel charge that ignition of the main relatively lean air-fuel mixture in the engine working cylinder is effected earlier in the operating cycle thereof due to better ignition of the stratified pilot air-fuel mixture.

It is to be understood that the specific construction of the improved combustion system herein disclosed and described is presented for the purpose of explanation and illustration and is not intended to indicate limits of the invention, the scope of which is defined by the following claims.

What is claimed is:

1. A combustion system for an internal combustion engine having a main combustion chamber and a working piston, said system comprising an elongated auxiliary combustion chamber of relatively constant transverse cross section communicating with the main combustion chamber through a convergent-divergent venturi, the convergent section of said venturi leading from said auxiliary combustion chamber to the constricted portion thereof making a relatively smaller angle with the central axis of said venturi than the divergent section leading into the main combustion chamber of the engine, means for supplying a stoichiometric air-fuel mixture to said auxiliary combustion chamber independently of engine load, means in said auxiliary combustion chamber on the opposite end thereof from said venturi for controlling the flow of the stoichiometric air-fuel mixture into said auxiliary combustion chamber, ignition means in said auxiliary chamber on the opposite end thereof from said venturi, and means for supplying a relatively lean air-fuel mixture to the main combustion chamber related to engine load whereby said stoichiometric mixture is stratified in the area of said ignition means on the compression stroke of the working piston and upon ignition effects ignition of said relatively lean mixture in the main combustion chamber through said venturi.

2. A combustion system for an internal combustion engine having a main combustion chamber and a working piston, said system comprising an elongated auxiliary combustion chamber of relatively constant transverse cross section communicating with the main combustion chamber, means between said auxiliary combustion chamber and the main combustion chamber of the engine for abetting fluid flow from said auxiliary combustion chamber into the main combustion chamber and for restricting fluid flow from the main combustion chamber into said auxiliary combustion chamber comprising a convergent-divergent venturi, the convergent section of said venturi making a relatively small angle with the central axis thereof to exhibit a relatively good flow coefficient to fluids passing outwardly of said auxiliary combustion chamber, the divergent section of said venturi making a relatively large angle with respect to the central axis thereof to exhibit a relatively poor flow coefficient to the passage of fluid into said auxiliary combustion chamber, means for supplying a stoichiometric air-fuel mixture to said auxiliary combuston chamber independently of engine load, means in said auxiliary combustion chamber on the opposite end thereof from said venturi for controlling the flow of the stoichiometric air-fuel mixture into said auxiliary combustion chamber, ignition means in said auxiliary chamber on the opposite end thereof from said venturi, and means for supplying a relatively lean air-fuel mixture to the main combustion chamber related to engine load whereby said stoichiometric mixture is stratified in the area of said ignition means on the compression stroke of the working piston and upon ignition effects ignition of said relatively lean mixture in the main combustion chamber through said venturi.

3. A combination system for operating an internal combustion engine having a main combustion chamber, said system comprising an elongated auxiliary combustion chamber having a portion of relatively constant transverse cross section communicating with the main combustion chamber through a plurality of axially aligned venturis, said venturis being disposed at opposite ends of said portion, each of said venturis having a convergent section leading outwardly of said auxiliary combustion chamber of relatively gradual slope and a divergent section of relatively steep slope with respect to the central axis thereof so as to exhibit good and poor coefficients to fluid flow outwardly and inwardly of said auxiliary combustion chamber, respectively, means for supplying a combustible air-fuel mixture to said auxiliary combustion chamber, a spark plug in said auxiliary combustion chamber, and means for supplying a relatively lean air-fuel mixture to the main combustion chamber, whereby said combustible mixture is stratified within said auxiliary combustion chamber in the area of said spark plug and upon ignition torches off said relatively lean mixture in the main combustion chamber through said venturis.

References Cited in the file of this patent

UNITED STATES PATENTS

| | | |
|---|---|---|
| 1,375,424 | Smith | Apr. 19, 1921 |
| 1,422,794 | Smith | July 11, 1922 |
| 2,032,986 | Howell | Mar. 3, 1936 |
| 2,098,875 | Mallory | Nov. 9, 1937 |
| 2,615,437 | Broderson | Oct. 28, 1952 |

FOREIGN PATENTS

| | | |
|---|---|---|
| 391,788 | Germany | Mar. 14, 1924 |
| 915,320 | France | July 22, 1946 |